(12) United States Patent
Tu et al.

(10) Patent No.: US 11,086,189 B1
(45) Date of Patent: Aug. 10, 2021

(54) SILICON OPTICAL MODULATOR, METHOD FOR MAKING THE SAME

(71) Applicant: INPHI CORPORATION, Santa Clara, CA (US)

(72) Inventors: Xiaoguang Tu, Santa Clara, CA (US); Jie Lin, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/739,973

(22) Filed: Jan. 10, 2020

(51) Int. Cl.
*G02F 1/225* (2006.01)
*G02F 1/21* (2006.01)
*G02B 6/134* (2006.01)

(52) U.S. Cl.
CPC ......... *G02F 1/2257* (2013.01); *G02B 6/1347* (2013.01); *G02F 1/212* (2021.01)

(58) Field of Classification Search
CPC ........ G02F 1/025; G02F 1/1228; G02F 1/127; G02F 1/21; G02F 1/212; G02F 1/225; G02F 1/2255; G02F 1/2257; G02B 6/1228; G02B 6/1347

USPC ......................................................... 385/1–3
See application file for complete search history.

(56) References Cited

U.S. PATENT DOCUMENTS

| | | | |
|---|---|---|---|
| 9,638,942 B2* | 5/2017 | Baehr-Jones | ......... G02F 1/2257 |
| 2017/0254955 A1* | 9/2017 | Poon | ..................... G02F 1/2257 |

* cited by examiner

*Primary Examiner* — Michael P Mooney

(57) ABSTRACT

A silicon optical modulator includes two silicon waveguide branches coupled between a 2×2 splitter at a common input end and a 2×2 splitter at a common output end. The modulator further includes at least one of the two silicon waveguide branches comprising a ridge-shape having a central portion of a height sandwiched in a width direction by a first side portion and a second side portion throughout a length of the waveguide. The central portion in each cross-section plane thereof includes a p-region and a n-region separated by a continuous borderline to form an irregular shaped PN junction. The borderline is configured to have at least one section-line with a sloped angle relative to the width direction and have a total border-length substantially longer than the height. The p-region is in contact with the first side portion and the n-region is in contact with the second side portion.

20 Claims, 11 Drawing Sheets providing a silicon layer in a silicon-on-insulator substrate

forming a first linear waveguide of a length in the silicon layer, comprising a ridge-shape having a central portion of a height of the silicon layer sandwiched in a nominal width direction by a first side portion and a second side portion throughout the length

forming a second linear waveguide substantially the same as and in parallel at a side of the first linear waveguide to form two branches of a Mach-Zehnder interferometer with a common input end and a common output end

forming an irregular shaped PN junction in the central portion with a junction borderline in each cross-sectional plane longer than the height throughout the length of the at least one of the first linear waveguide and the second linear waveguide

FIG. 6

SILICON OPTICAL MODULATOR, METHOD FOR MAKING THE SAME

BACKGROUND OF THE INVENTION

The present invention relates to silicon photonics devices and methods. More particularly, the present invention provides a silicon optical modulator based on a Mach-Zehnder interferometer structure with prolonged PN-junction border line and methods for making the same.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. Future optical communication system is driven by the increasing demand of higher data bandwidth and lower cost. Silicon photonics integration offers the best solutions as its huge progress on the performance and CMOS compatible fabrication process.

Over the past, high data rate communication has been widely implemented via optical network, in which data signals are carried by laser light that is specifically modulated using various kinds of electro-optic modulators. Silicon-based Mach-Zehnder modulator is a widely used electro-optic modulator for handing travels of high-speed data between centers. There are three key indicators that determine the performance of the silicon optical modulator which is modulation efficiency, working bandwidth and optical loss. Improvement on each of them always come at the cost of losing another. An improved silicon optical modulator with high modulation efficiency and working bandwidth but low in optical loss over conventional ones is desired.

BRIEF SUMMARY OF THE INVENTION

The present invention relates to silicon photonics devices and methods. More particularly, the present invention provides a silicon optical modulator based on a Mach-Zehnder interferometer structure with an irregular-shaped and prolonged PN-junction border line and methods for making the same. In certain embodiments, the invention is applied for high bandwidth optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

An alternative method to increase the bandwidth is to move the optical devices close to electrical device. Silicon photonics is an important technology for moving optics closer to silicon. For example, electric signal can be converted to optical signal by one or more silicon photonic-based electro-optic modulation devices in which a signal-controlled element exhibiting the electro-optic (EO) effect is used to modulate a beam of light. EO effect in silicon usually means the change of optical refractive index and absorption coefficient. There are two kinds of EO effect in silicon the direct EO effect and in-direct EO effect. As silicon has a symmetric atom structure, there is no first-order direct EO effect in silicon and the second-order direct EO effect (Kerr effect) is week, silicon optical modulator is usually designed based on the in-direct EO effect in silicon which is free-carrier dispersion effect. Under free-carrier dispersion effect, the refractive index and absorption coefficient of doped silicon can be changed along with the concentration of free electron and holes which can be tuned by the external applied electrical field. Usually the changing of free-carriers concentration is realized by implanting a PN junction in a silicon waveguide so that when there is optical wave traveling through the waveguide, the optical parameters such as optical phase and optical intensity can be tuned by the external electrical field. Additionally, the refractive index change is utilized in a Mach-Zehnder interferometer structure having two waveguide branches with at least one of them being tunable in phase so as to convert the optical phase change to optical intensity change. In this patent application, we will disclose a silicon optical modulator with a novel PN junction structure with prolonged border line to enhance modulation efficiency and reduce optical loss for high speed telecommunication.

In a specific embodiment, the present invention provides a silicon optical modulator including two silicon waveguide branches coupled between a first 2×2 splitter at a common input end and a second 2×2 splitter at a common output end. The silicon optical modulator additionally includes at least one of the two silicon waveguide branches in a ridge-shape having a central portion of a height sandwiched in a nominal width direction by a first side portion and a second side portion throughout a length of the waveguide. Furthermore, the central portion of the silicon waveguide in each cross-section plane thereof includes a p-region and a n-region separated by a continuous borderline to form an irregular shaped PK junction. The border line is configured to have at least one section-line with a sloped angle off a nominal height direction and have a total border-length substantially longer than the height of the central portion. The p-region at least partially is in contact with the first side portion and the n-region at least partially is in contact with the second side portion.

In another specific embodiment, the present invention provides a method for forming a silicon optical modulator. The method includes providing a silicon layer in a silicon-on-insulator substrate. Additionally, the method includes forming a first linear waveguide of a length in the silicon layer. The first linear waveguide includes a ridge-shape having a central portion of a height of the silicon layer sandwiched in a nominal width direction by a first side portion and a second side portion throughout the length of the waveguide. Furthermore, the method includes forming a second linear waveguide substantially the same as and in parallel at a side of the first linear waveguide to form two branches of a Mach-Zehnder interferometer with a common input end and a common output end. Moreover, the method includes forming an irregular shaped PN junction in the central portion throughout the length of the at least one of the first linear waveguide and the second linear waveguide. The PN junction in each cross-section plane of the central portion has a p-region and a n-region separated by a continuous border line. The border line is configured to have at least one section-line with a sloped angle off a nominal height direction and have a total border-length substantially longer than the height of the central portion. The p-region at least partially is in contact with the first side portion and the n-region at least partially is in contact with the second side portion.

The present invention achieves these benefits and others in the context of known silicon photonics technology. Specifically, this invention provides a silicon optical modulator which has a high modulation efficiency which makes the length of the modulator much shorter for a same phase shift volume. Shorter length of the modulator also helps reducing optical loss and electrodes microwave loss so that a higher optical bandwidth can be achieved. This invention also helps reduce the gap of silicon photonics integration circuits so that the data centers communication can enjoy more on the low-cost advantage of CMOS process based silicon photonics. A further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 6 is a flow chart illustrating a method of forming a silicon optical modulator with an irregular PN junction according to an embodiment of the present invention.

DETAILED DESCRIPTION OF THE INVENTION

The present invention relates to silicon photonics devices and methods. More particularly, the present invention provides a silicon optical modulator based on a Mach-Zehnder interferometer structure with an irregular-shaped and prolonged PN-junction border line and methods for making the same. In certain embodiments, the invention is applied for high bandwidth optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, central, side, height, width, length, forward, reverse, clockwise and counter clockwise have been used for convenience purposes only and are not intended to imply any particular fixed direction. Instead, they are used to reflect relative locations and/or directions between various portions of an object.

Figure 1:
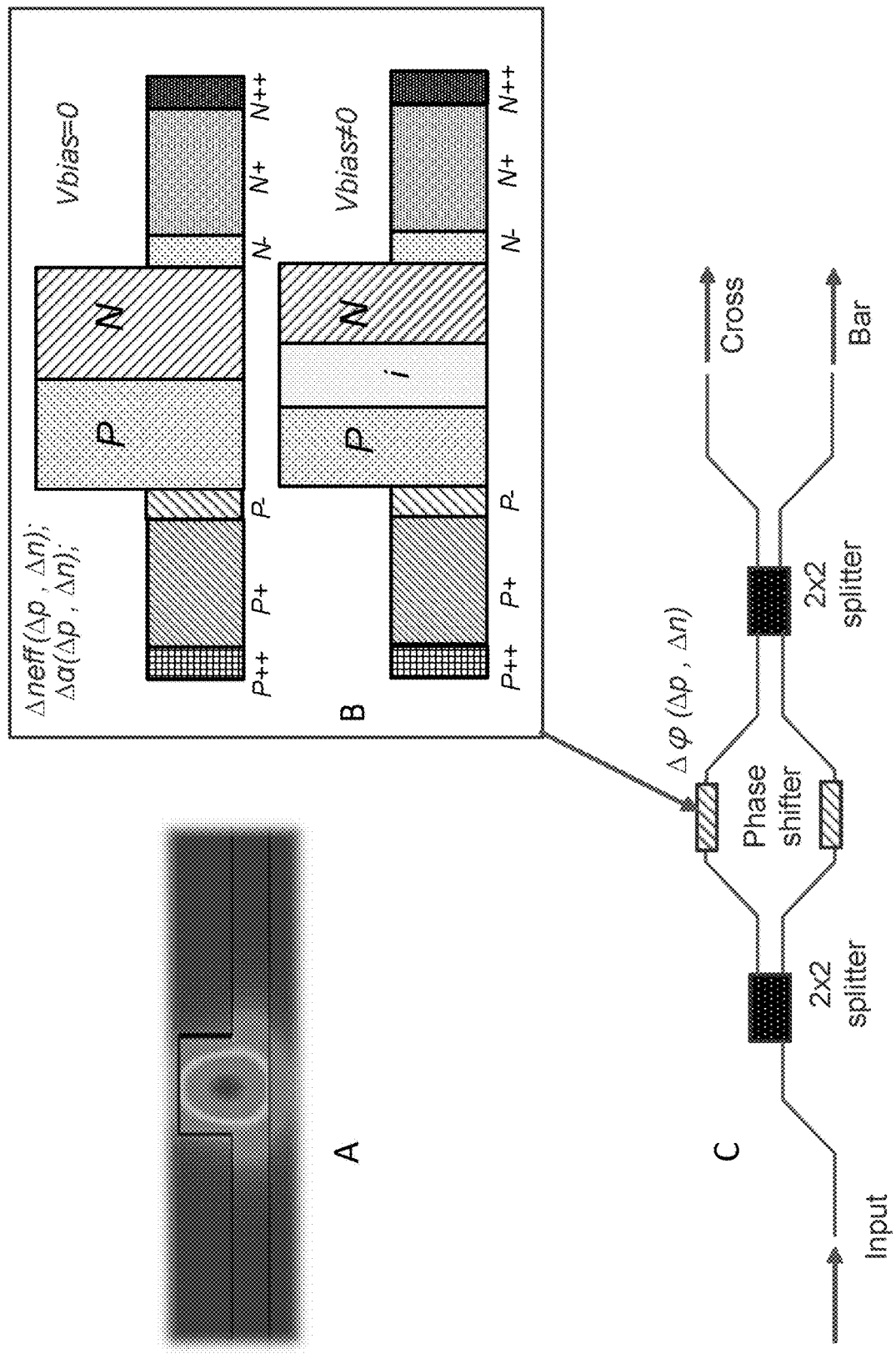
FIG. 1 is a simplified diagram illustrating working principle of a silicon optical modulator based on Mach-Zehnder interferometer with two waveguide branches: A) optical intensity profile; B) cross-sectional view of the silicon waveguide and PN junction; C) Mach-Zehnder interferometer structure.

FIG. 1 is a simplified diagram illustrating working principle of a silicon optical modulator based on Mach-Zehnder interferometer with two waveguide branches. In part A) of the figure, optical intensity profile in a cross-section plane of the waveguide is shown, indicating most energy concentrated near a central portion of the ridge-shaped silicon waveguide. In part B) of the figure, a cross-sectional view of the ridge-shaped silicon waveguide and a PN junction formed at the central portion. The PN junction is formed typically with a straight borderline along the middle height line of the rectangular shaped central portion of the ridge-shaped silicon waveguide before applying a bias voltage (Vbias=0). After applying the bias voltage (Vbias≠0), a depletion region (i) is formed by changing the electrical field therebetween so as to alter the free-carrier concentration. When there is optical wave traveling through the silicon waveguide, particularly with its main intensity being concentrated in the central portion where the PN junction exists, the optical parameters such as optical phase can be tuned by the external electrical field. In part C) of the figure, Mach-Zehnder interferometer structure with two branches of waveguides configured as reversed PN junctions is utilized to convert the optical phase change to optical intensity change to achieve optical modulation. Optionally, a first 2×2 splitter is coupled to a common input end of the two branches of waveguides and a second 2×2 splitter is coupled to a common output end. One input port of the 2×2 splitter is configured to receive an input optical signal. The input optical signal is guided into the two branches by the first 2×2 splitter and respectively tuned in optical phases by the applied bias voltages and recombined via interference effect at the common output end through the second 2×2 splitter outputting at either a bar output port or a cross output port with optical intensity modulation converted from the phase changes.

Typically, the modulator within silicon photonic platform includes two identical Si-based waveguides. The two Si-based waveguides can be made of Si or SiGe. Each waveguide includes a PN junction with a p-type region (p-region) interfacing a n-type region (n-region) throughout a length thereof. The p-region and the n-region of the PN junction are formed by respectively doping p- or n-type electric impurity (dopant) into pre-patterned waveguide material. There are three key indicators that determine the performance of the silicon optical modulator which is modulation efficiency, working bandwidth and optical loss. While, improvement on each of them always come at the cost of losing another. For example, pushing for high modulation efficiency usually requires larger capacity provided with the PN junction which is typically resulted in a longer length and larger optical loss or poor optical bandwidth. In the current example, the Si-based waveguide is configured to be a ridge-shape throughout its length having a central portion of a greater height sandwiched by a first side portion and a second side portion of a smaller height across a width direction, all being formed on a silicon-on-insulator (SOI) substrate. The central portion optionally has a cross-section plane in a rectangular shape with a height and a width. The height is set to be greater than that of each of the first side portion and the second side portion. Optionally, the width is much greater than the height but is equal to or less than a width of each of the first side portion and the second side portion. In most existing design for the Mach-Zehnder interferometer structure with the PN junction of the ridge-shaped Si waveguide, the junction border line is formed regularly near the middle height line of the central portion for the convenience of manufacture process. It is primarily limited its PN junction capacitance thereby limiting the modulation efficiency of the silicon optical modulator. This invention provides several embodiments of a silicon optical modulator which has a high modulation efficiency to make the length of the modulator much shorter for a same phase shift volume and to reduce optical loss and electrodes microwave loss so that a higher optical bandwidth can be achieved.

Figure 2A:
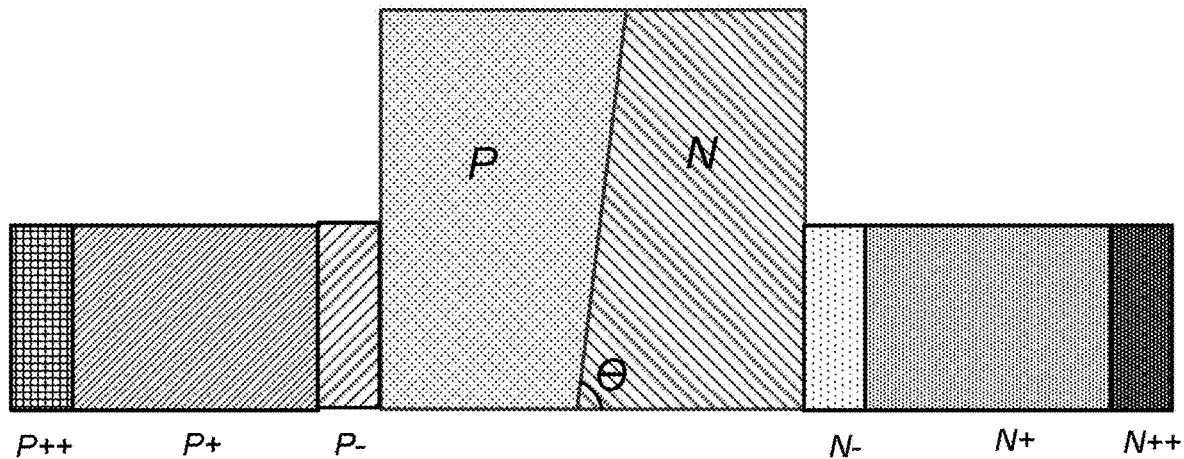
FIG. 2A is a cross-sectional view of a ridge-shaped Si waveguide with an irregular central portion PN junction according to an embodiment of the present invention.
Figure 2B:
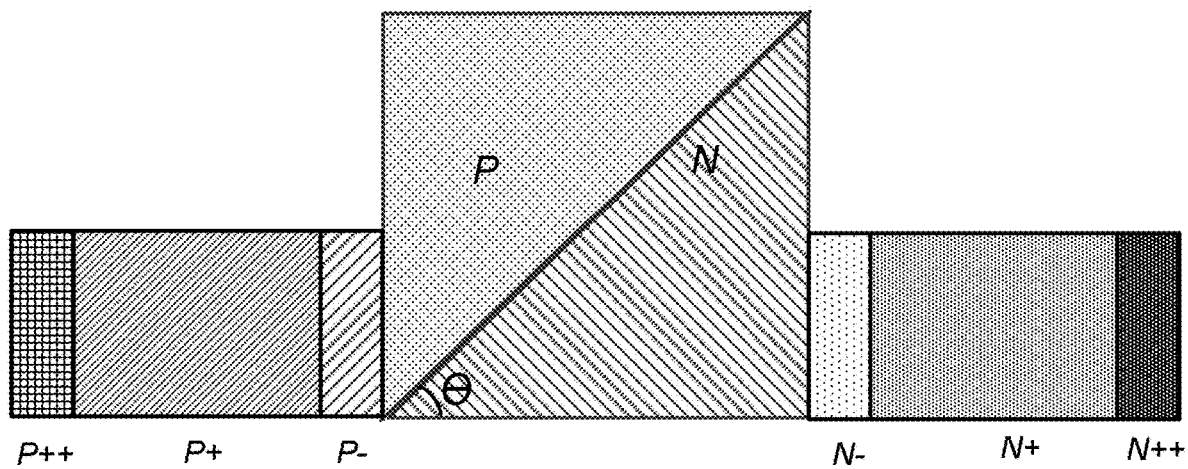
FIG. 2B is a cross-sectional view of a ridge-shaped Si waveguide with an irregular central portion PN junction according to another embodiment of the present invention.

FIGS. 2A through 2D provide cross-sectional view of a ridge-shaped Si waveguide with an irregular PN junction in central portion according to some embodiments of the present invention. These diagrams are merely examples, which should not unduly limit the scope of the claims. One of ordinary skill in the art would recognize many variations, alternatives, and modifications. FIG. 2A shows a cross-sectional view of a PN junction in the central portion of the Si waveguide which overall has a same ridge-shaped structure as the Si-based waveguide shown in FIG. 1, including a central portion of a height sandwiched by a first side portion and a second side portion along its nominal width direction and throughout a length of the Si waveguide. Optionally, the central portion is given a rectangular shape with a height and a width as shown in a cross-section plane.

Optionally, the PN junction in the cross-section plane has a sloped border line separating a p-type doping region (i.e., p-region) from a n-type doping region (n-region) with an angle θ being off 90 degrees relative to a nominal width (horizontal in this figure) direction. Optionally, the angle θ is set to be smaller than 90 degrees. Optionally, the angle θ is set to be greater than 90 degrees. Optionally, the angle θ is in a range between 1 degree to 89 degrees, or in a range between 91 degrees and 179 degrees, relative to the nominal width direction. In other words, the border-length is prolonged comparing to the nominal height of the central portion. Effectively, the PN junction of the embodiment has a much-enlarged junction plane throughout the length of the Si waveguide. A prolonged border line for the PN junction leads to a larger charging capacity, thereby higher modulation efficiency via EO effect. Accordingly, a higher modulation efficiency can result in a shorter length of the Si waveguide under a same phase shift volume. Furthermore, the shorter length leads to smaller optical loss and electrodes microwave loss so that a higher optical bandwidth can be achieved.

Optionally, the border line may not be limited to near the middle region of the central portion, i.e., either p-region or n-region may have a larger size than the other. Optionally, the two end points of the border line across the central portion may respectively be at a top edge and bottom edge, or at top edge and side edge, or at side edge and bottom edge of the rectangular central portion. Optionally, in a specific embodiment shown in FIG. 2B, the two end points of the border line across the central portion may be at an upper right corner and a lower left corner, or an upper left corner and a lower right corner of the rectangular central portion. Optionally, in a specific embodiment shown in FIG. 2D, the two end points of the border line across the central portion may be at an upper right corner and a left side edge, or an upper left corner and a right side edge of the rectangular central portion. At least, no matter what specific embodiment of the border line is, a portion of the p-region of the PN junction is in contact with the first side portion of the ridge-shaped Si waveguide and a portion of the n-region the PN junction is in contact with the second side portion.

In the embodiment, the first side portion includes three doping sections: a P– section with smaller p-type dopant concentration being in contact with the p-region of the PN junction; a heavier doped P+ section is next to the P− section; and a super-heavily doped P++ section is further next to the P+ section. Optionally, the P++ section is configured to be utilized for forming a first electrode using a metal feasible to form strong ohmic contact with the highly doped p-type silicon material. Correspondingly, the second side portion also includes three doping sections: a N− section with smaller n-type dopant concentration being in contact with the n-region of the PN junction; a heavier doped N+ section is next to the N− section; and a super-heavily doped N++ section is further next to the N+ section. Optionally, the N++ section is configured to be used for forming a second electrode using another metal feasible to form a strong ohmic contact with the highly doped n-type silicon material.

Figure 2C:
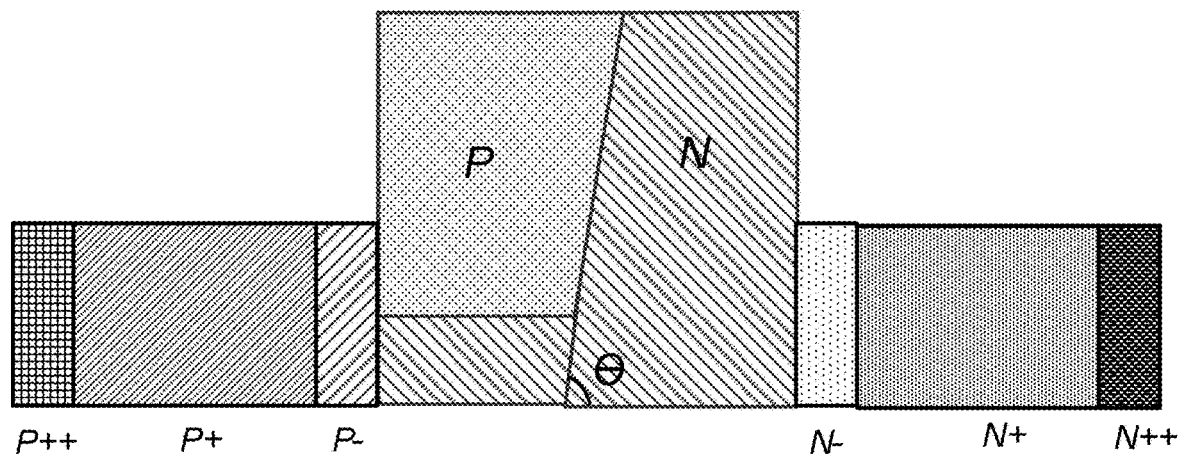
FIG. 2C is a cross-sectional view of a ridge-shaped Si waveguide with an irregular central portion PN junction according to yet another embodiment of the present invention.
Figure 2D:
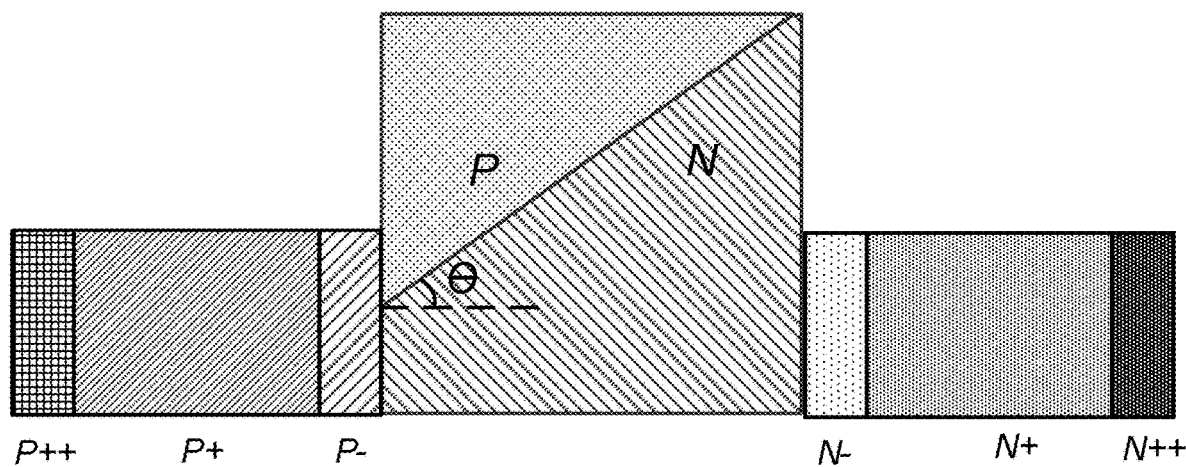
FIG. 2D is a cross-sectional view of a ridge-shaped Si waveguide with an irregular central portion PN junction according to still another embodiment of the present invention.

FIG. 2C shows another embodiment wherein the borderline of the PN junction may not be linear as any existing design. Optionally, at least a section-line of the border line can be near or even in parallel to the nominal width direction. Optionally, a section-line of the border line can be a sloped one with an angle θ off 90 degrees relative to the nominal width direction. In general, the border line of the PN junction can be made irregular and prolonged across the central portion as much as the process is allowed yet at least a portion of the p-region on one side of the border line should be kept in contact with the first side portion (particularly the P− section) of the ridge-shaped Si waveguide and at least a portion of the n-region on another side of the border line should be kept in contact with the second side portion (particularly the N− section).

Figure 3:
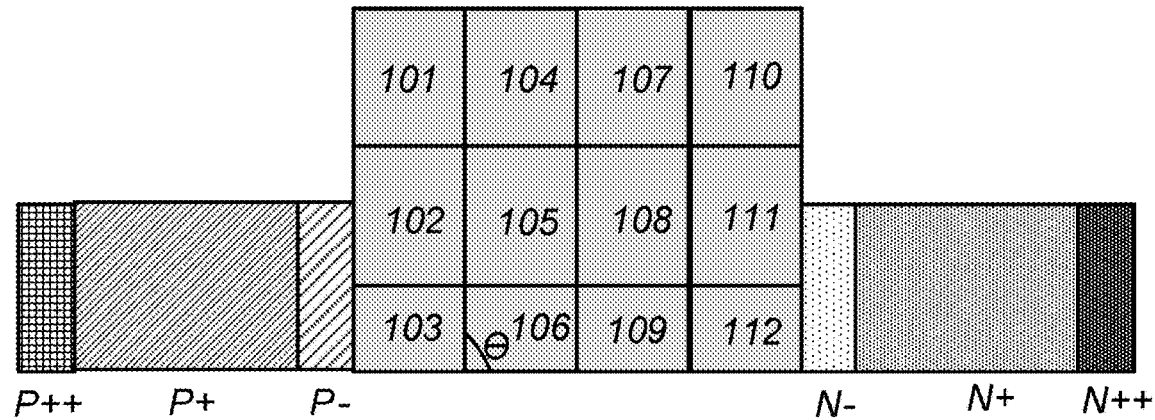
FIG. 3 is a schematic diagram of a central portion of the ridge-shaped Si waveguide comprising multiple sections according to an embodiment of the present invention.

FIG. 3 is a schematic diagram of the central portion of the ridge-shaped Si waveguide comprising multiple sections according to an embodiment of the present invention. This diagram is merely an example, which should not unduly limit the scope of the claims. One of ordinary skill in the art would recognize many variations, alternatives, and modifications. As shown is an embodiment of the central portion being (virtually) divided into multiple sections configured to be individually doped with different (n or p) types of dopants with different implantation energies and doses. Depending on dimensions of the Si waveguide including a height and a width of the central portion (throughout the length) and available implantation processing tools, the multiple sections can be four sections with two rows and two columns, or six sections with three rows and two columns, or 12 sections with three rows and four columns, e.g., section 101 through section 112 as shown in FIG. 3. Here, a row of sections is referred to several sections arranged along the nominal width direction and a column of sections is referred to several sections arranged along the nominal height direction. Optionally, row boundary may not be in horizontal direction exactly and column boundary also may not be in vertical direction perfectly. Optionally, a width of each column may not be the same. Optionally, a height of each row may not be the same. In other words, the column boundary can be a sloped section-line with an angle θ being off 90 degrees relative to the nominal width direction or the row boundary also can be a sloped section-line with an angle off 0 degree (similar to that in FIG. 2D) relative to the nominal width direction.

Figure 4:
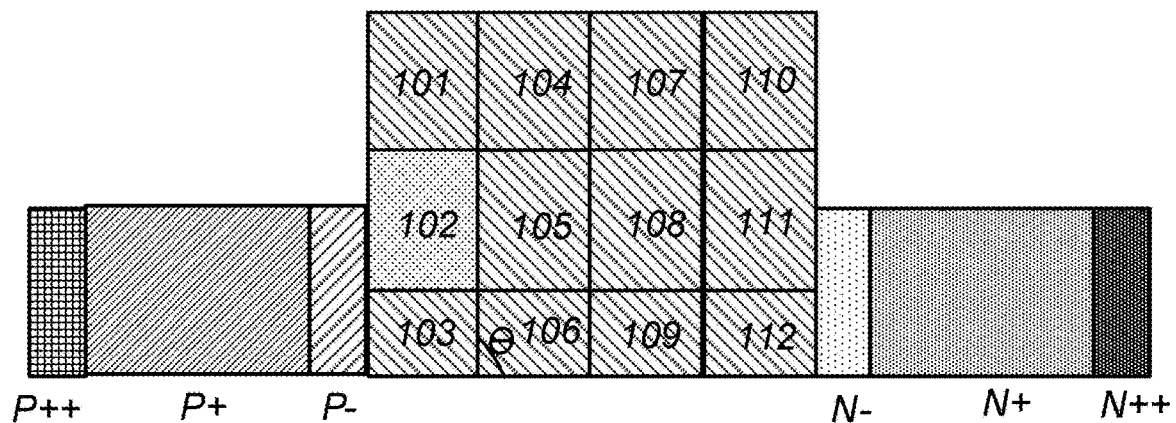
FIG. 4 is a schematic diagram of a central portion of the ridge-shaped Si waveguide with the multiple sections being selectively implanted with either p-type or n-type dopants in which at least one p-type doping section is in contact with a first side portion of the waveguide and at least one n-type section is in contact with a second side portion of the waveguide according to an embodiment of the present invention.

FIG. 4 is a schematic diagram of a central portion of the ridge-shaped Si waveguide with the multiple sections being selectively implanted with either p-type or n-type dopants in which at least one p-type doping section is in contact with a first side portion of the waveguide and at least one n-type section is in contact with a second side portion of the waveguide according to an embodiment of the present invention. This diagram is merely an example, which should not unduly limit the scope of the claims. One of ordinary skill in the art would recognize many variations, alternatives, and modifications. As shown, the multiple doping sections are just those (section 101 through section 112) virtually defined in the central portion of the Si waveguide of the FIG. 3. In this embodiment, the section 102 is an only one p-type doping section of the p-region of the PN junction that is in contact with the first side portion of the Si waveguide. The rest of all sections are n-type doping sections connected to each other to form the n-region of the PN junction. Thus, the top edge, right side edge, and the bottom edge of the section 102 forms the border line separating the p-region and the n-region. Although making only one section to be entire p-type (or n-type) region may not be a best mode on yielding a prolonged border line of the PN junction, it is still feasible if the only one section is allowed with relative larger side or properly sloped border line. Optionally, alternative embodiments include making two or more sections into p-type (or n-type) doping sections and rest of other sections into n-type (or p-type) doping sections. In the embodiments, the p-type doping sections are at least connected one another to from the p-region and all n-type doping sections are at least connected together to form the n-region. At least one p-type doping section is in contact with the first side portion and at least one n-type doping section is in contact with the second side portion.

Figure 5A:
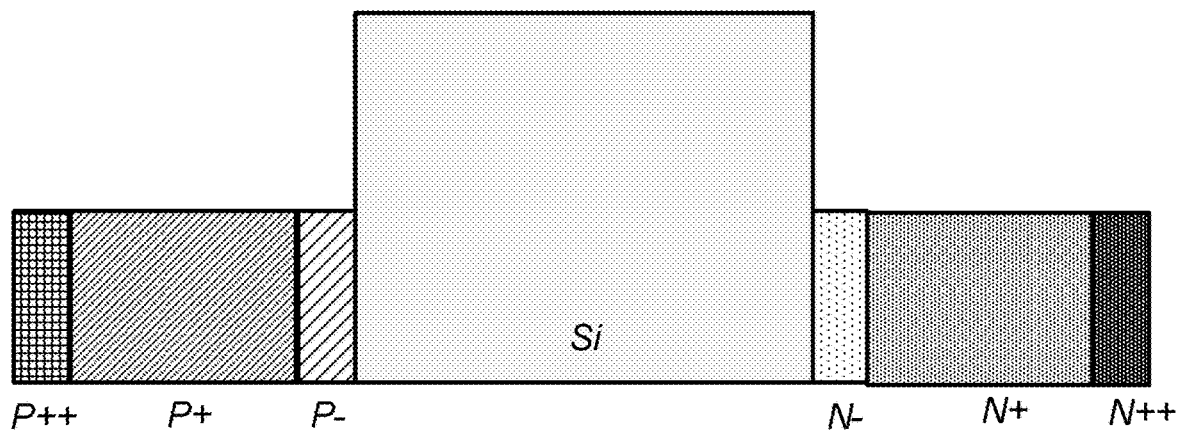
FIGS. 5A through 5F are simplified diagrams showing a method of forming an irregular PN junction with a prolonged border line according an embodiment of the present invention.

FIGS. 5A through 5F are simplified diagrams showing a method of forming an irregular PN junction with a prolonged border line according an embodiment of the present invention. These diagrams are merely examples, which should not unduly limit the scope of the claims. One of ordinary skill in the art would recognize many variations, alternatives, and modifications. Referring to FIG. 5A, in a cross-sectional view, a ridge-shaped Si waveguide is provided with a rectangular-shaped central portion of a height and a width throughout a length (not visible) sandwiched by a first side portion and a second side portion having a lower height. As shown, the central portion is optionally provided with a layer of silicon from a silicon-on-insulator substrate and initially is in an intrinsic (non-doped) state. The first side portion has been doped with three different doping levels of a p-type dopant to form a P++ section next to a P+ section which is further next to a P− section. The P− section is in contact with the central portion. The second side portion also has been doped with three different doping levels of a n-type dopant to form a N− section next to a N+ section which is further next to a N++ section. The N− section is in contact with the central portion. Optionally, a cladding process is performed respectively over the first side portion and the second side portion. Further, a via can be formed on top of the P++ section in the first side portion or N++ section in the second side portion. A metal deposition process then can be performed to deposit metal material into the respective vias to form a first electrode contact with the P++ section or a second electrode contact with the N++ section. Corresponding electrodes formed for each PN junction in each branch of two Si Waveguides thereof can then be used for applying bias voltages to tune the electrical field across each Si waveguide.

Figure 5B:
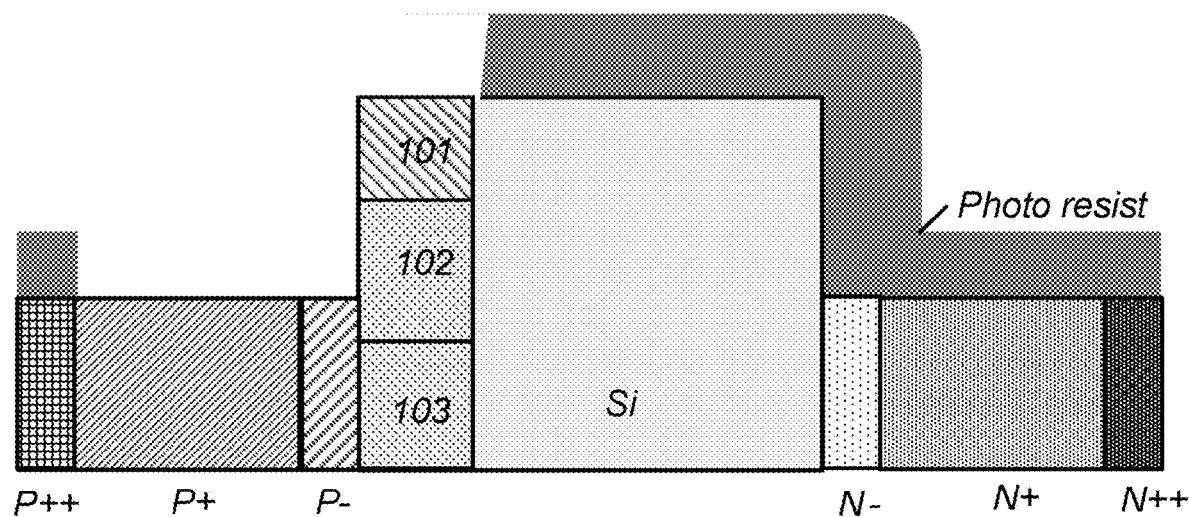

Referring to FIG. 5B, the ridge-shaped Si waveguide shown in FIG. 5A is coated from atop by a layer of photo resist. Additionally, a window of the photo resist layer is opened by lithography in a section near the left side edge of the central portion including part of the first side portion. Optionally, there is no need to perform precise alignment to ensure the window to be aligned with the left side edge of the central portion. Optionally, the window creates a first columnized section having a flexible width which is a portion of the width of the central portion. The first columnized section optionally includes three rows of (virtual) sections 101, 102, and 103. Furthermore, one or more implantation processes can be performed to implant a p-type dopant into the first columnized section through the window to form a p-type doping section 103 (a bottom row) and another p-type doping section 102 (a middle row), and further implant a n-type dopant into the first columnized section through the window to form a n-type doping section 101 (a top row). By controlling dopant types, implantation energies, and doses, the implantation processes can lead to different types of doping sections with different doping levels. The doping sections structure formed in FIG. 5B is merely one example. Other possibilities include 1) all three sections, 101, 102, and 103 being p-type doping sections (optionally with different doses at different sections or depths); 2) 102 being a p-type doping section and 101 and 103 being n-type doping sections; 3) 103 being a p-type doping section and 101 and 102 being n-type doping sections. At least one p-type doping section is in contact with the first side portion. Optionally, the inner column side boundaries of the sections 101, 102, and 103 can be formed with a sloped angle that is off from nominal 90 degrees relative to the nominal width direction. Optionally, the inner row boundaries of the sections also can be formed with a sloped angle that off from 0 degree relative to the nominal width direction. After the implantation processes, the layer of photo resist can be removed.

Figure 5C:
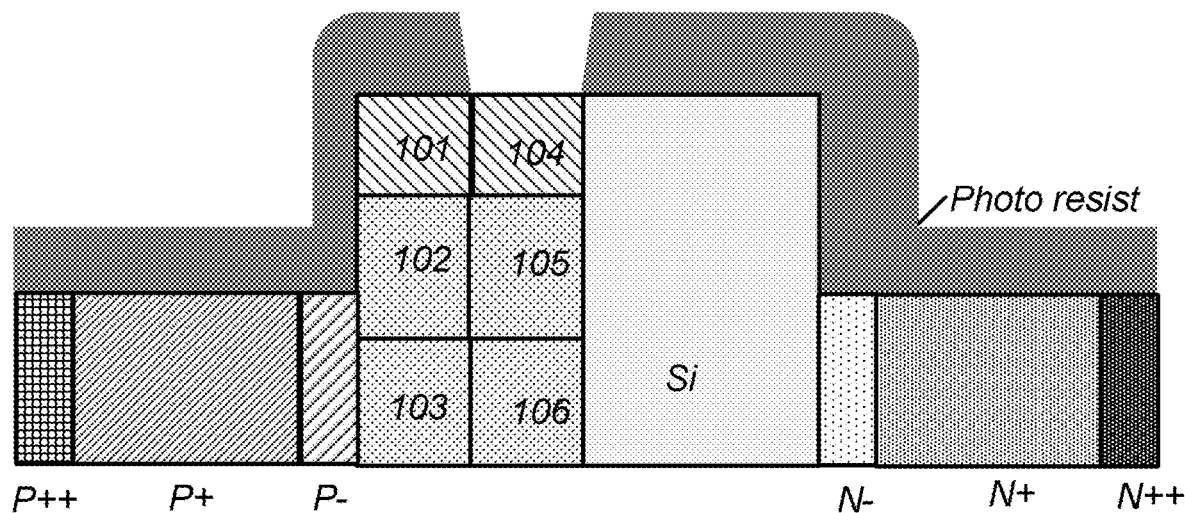

Referring to FIG. 5C, a new layer of photo resist is coated from atop of the Si waveguide. Additionally, a window is lithographed to open a second columnized section substantially next to the first columnized section. Optionally, the second columnized section includes three rows of (virtual) sections 104, 105, and 106. Similarly, one or more implantation processes can be performed to form three p-type or n-type doping sections in sections 104, 105, and 106. Merely by example, FIG. 5C shows that the section 104 is formed as a n-type doping section and sections 105 and 106 are formed as p-type doping sections. Of course, other alternative doping section structures are possible. At least the p-type doping section in the second columnized section is connected with the p-type doping section formed previously in the first columnized section and at least the n-type doping section in the second columnized section is connected with the n-type doping section formed previously in the first columnized section. After the implantation processes, the layer of photo resist is removed.

Figure 5D:
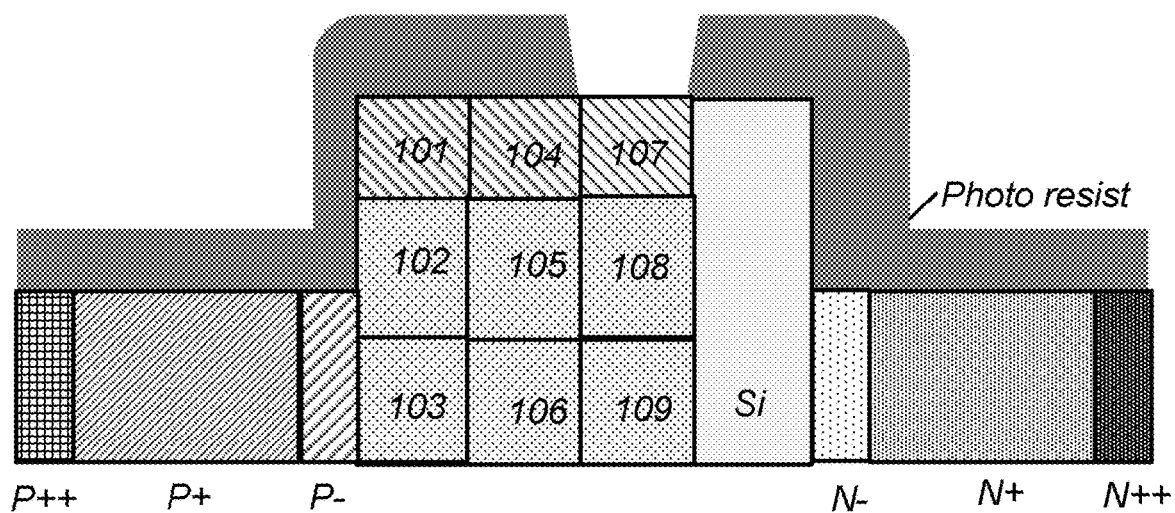

Referring to FIG. 5D, a new layer of photo resist is coated from atop of the Si waveguide. Additionally, a window is lithographed to open a third columnized section substantially next to the second columnized section. Optionally, the third columnized section includes three rows of (virtual) sections 107, 108, and 109. Similarly, one or more implantation processes can be performed to form three p-type or n-type doping sections in sections 107, 108, and 109. Merely by example, FIG. 5D shows that the section 107 is formed as a n-type doping section and sections 108 and 109 are formed as p-type doping sections. Of course, other alternative doping section structures are possible. At least the p-type doping section in the third columnized section is connected with the p-type doping section formed previously in the second columnized section and at least the n-type doping section in the third columnized section is connected with the n-type doping section formed previously in the second columnized section.

Figure 5E:
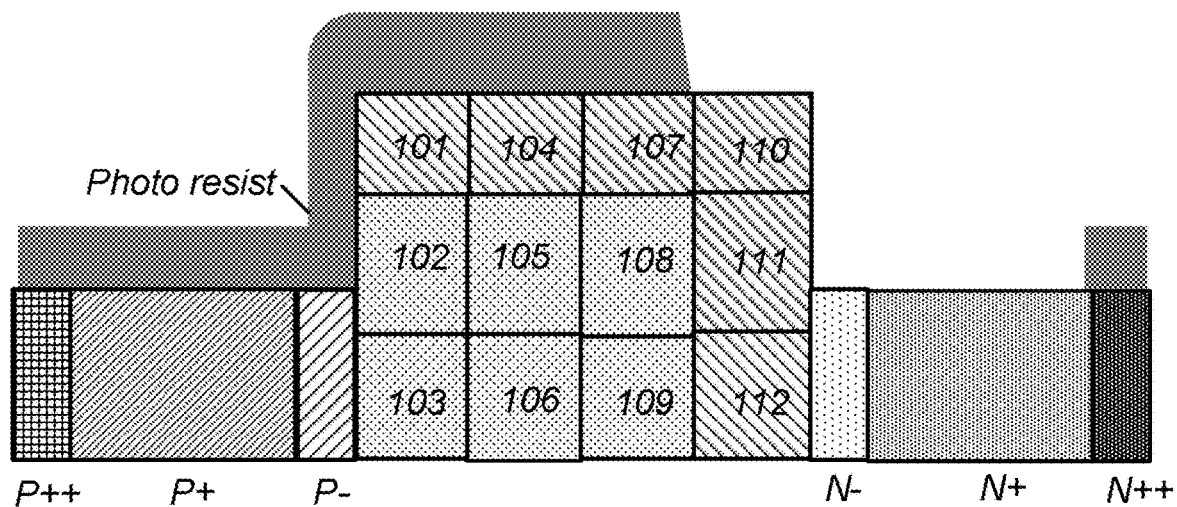

Referring to FIG. 5E, a new layer of photo resist is coated from atop of the Si waveguide. Additionally, a window is lithographed to open a fourth columnized section substantially next to the second columnized section over a right side edge of the central portion including part of the second side portion. Again, no need to ensure the window edge being aligned with the right side edge. Optionally, the fourth columnized section includes three rows of (virtual) sections 110, 111, and 112. Similarly, one or more implantation processes can be performed to form three p-type or n-type doping sections in sections 110, 111, and 112. Merely by example, FIG. 5E shows that all three sections 110, 111, and 112 are formed as n-type doping sections. Of course, other alternative doping section structures are possible. At least the n-type doping section in the fourth columnized section is connected with the n-type doping section formed previously in the third columnized section. At least one n-type doping section in the fourth (a last one) columnized section is in contact with the second side portion.

Figure 5F:
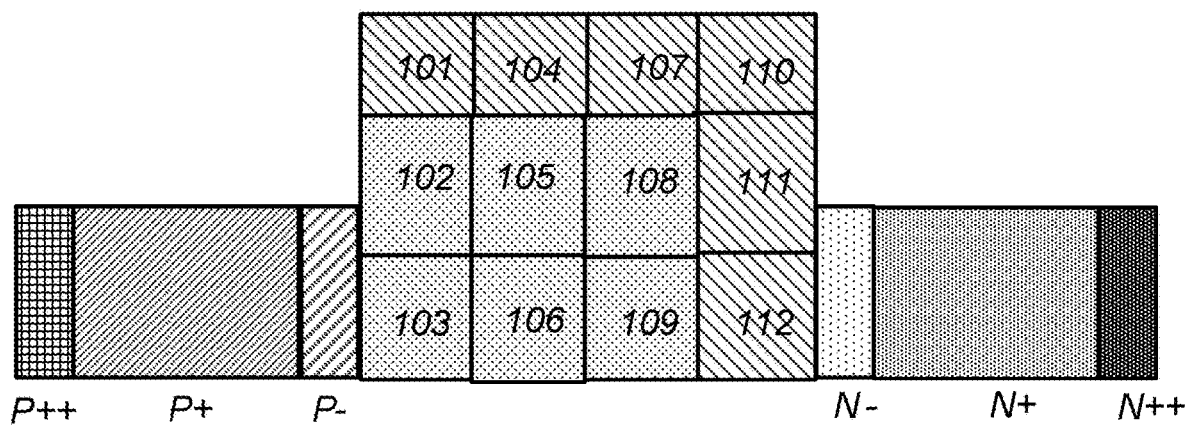

Referring to FIG. 5F, as the layer of photo resist is removed, a PN junction is formed in the central portion with an irregular border line which has a border-length much longer than the nominal height of the central portion. Merely by example, multiple sections 102, 103, 105, 106, 108, and 109 are implanted as p-type doping sections and connected to form a p-region of the PN junction and rest multiple sections 101, 104, 107, 110, 111, and 112 are implanted as n-type doping sections and connected to form a n-region of the PN junction, giving a border line including a section-line between section 101 and 102, a section-line between 104 and 105, a section-line between 107 and 108, a section-line between 111 and 108, and a section-line between 112 and 109. The p-region has sections 102 and 103 in contact with the first side portion and the n-region has sections 111 and 112 in contact with the second side portion.

In another aspect, the present disclosure provides a method for making a silicon optical modulator based on silicon photonics platform. FIG. 6 is a flow chart illustrating a method of forming a silicon optical modulator with an irregular PN junction according to an embodiment of the present invention. The silicon optical modulator is a mere silicon-based photonics chip device with all elements being fabricated from a single substrate. Referring to FIG. 6, the method includes a step of providing a silicon layer in a silicon-on-insulator substrate. Additionally, the method includes a step of forming a first linear waveguide of a length in the silicon layer. The first linear waveguide includes a ridge-shaped structure having a central portion of a height of the silicon layer sandwiched in a nominal width direction by a first side portion and a second side portion throughout the length.

Furthermore, the method includes a step of forming a second linear waveguide substantially the same as and in parallel at a side of the first linear waveguide to form two branches of a Mach-Zehnder interferometer with a common input end and a common output end. Alternatively, the step of forming the first linear waveguide and the step of forming the second linear waveguide are performed at a same time. The first linear waveguide and the second linear waveguide are configured to be substantially redundant in ridge shape but just shifted a certain distance in a same substrate. Optionally, a 2×2 splitter (also a Si-based device formed at the same substrate) can be inserted at the common input end configured to split an optical signal into the two branches and another 2×2 splitter can be inserted at the common output end configured to combine optical interference signal from the two branches to respectively output to a bar output port and a cross output port to achieve optical modulation.

Figure 8:
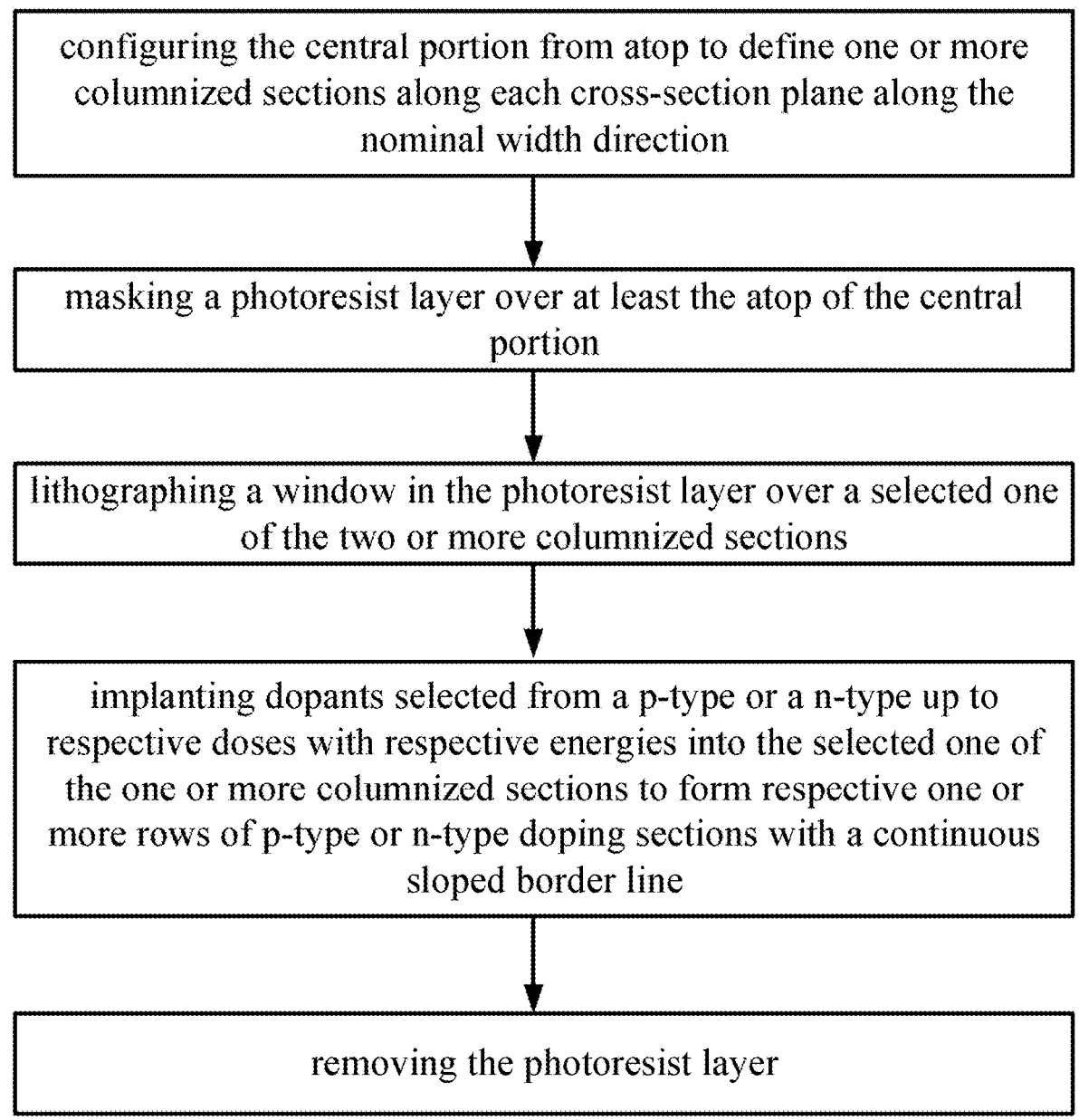
FIG. 8 is a flow chart illustrating a method of forming a sloped border line of the PN junction in the central portion of the waveguide according to an embodiment of the present invention.

Moreover, the method includes a step of forming an irregular shaped PN junction in the central portion with a junction border line in each cross-sectional plane longer than the height throughout the length of the at least one of the first linear waveguide and the second linear waveguide. The step of forming an irregular shaped PN junction in the central portion further is shown with various sub-steps in the FIG. 8 in some embodiments of the present disclosure. Referring to FIG. 8, in an embodiment, the step includes at least a sub-step of configuring the central portion from atop to define one or more columnized sections along each cross-section plane along the nominal width direction. This sub-step is schematically revealed in FIG. 3 and substantially described in previous paragraphs. By looking top-down each columnized section includes one or more (typically up to three) rows, virtually, though only top width of the columnized section is visible from the atop of the central portion.

Additionally, the step includes a sub-step of forming a mask layer over at least the atop of the central portion. Optionally, the mask layer is a photo resist layer. The step then includes another sub-step of forming a window in the mask layer over a selected one of the two or more columnized sections. Optionally, the sub-step of forming the window includes using lithography to form a window in a photo resist layer. The sub-step of forming the window basically using the window to define the top width of the selected one columnized section of the central portion.

Furthermore, the step includes a sub-step of doping a dopant selected from a p-type or a n-type up to respective doses with respective energies into the selected one of the one or more columnized sections to form respective one or more rows of p-type or n-type doping sections with a continuous sloped border line. The step of forming an irregular shaped PN junction in the central portion is at least partially described in FIGS. 5A through 5F. Particularly, the sub-step of doping a dopant selected from a p-type or a n-type up to respective doses with respective energies into different rows of the selected one columnized section is at least partially described in FIGS. 5B through 5E. Moreover, forming the irregular shaped PN junction specifically includes forming an irregular and prolonged border line that can be sloped with respect to the nominal width direction with an angle off nominal 90 degrees.

FIGS. 7A through 7G also schematically show the method of making an irregular and prolonged border line of the PN junction in the central portion according to some embodiments of the present disclosure. Starting from a ridge-shaped Si waveguide having a central portion being an intrinsic state (see FIG. 7A), a photoresist layer is optionally coated over the top of the Si waveguide. As a first window of the photoresist layer is opened by lithography to virtually create a first columnized section next to a first side edge of the central portion (which is next to the first side portion), an implantation of p-type dopant through the first window into the first columnized section. By controlling the implantation energy and dose, a p-type doping region can be formed with different doping levels at different depth of the columnized section. For example, a P_1st region is doped with a p-type dopant in a first concentration at a relative shallower depth and a first diffused width and a P_2nd region is formed with the p-type dopant in a second concentration at a relative deeper depth and a second diffused width. Because of different implantation energy and dose used during the process, the second diffused width at the deeper depth is made to be larger than the first diffused width at a shallower depth of first columnized section. Due to the differences created by the step above, the boundary of the just-formed p-type region can be a sloped one with an angle larger than 90 degrees relative to the nominal width direction (see FIG. 7B).

Figure 7A:
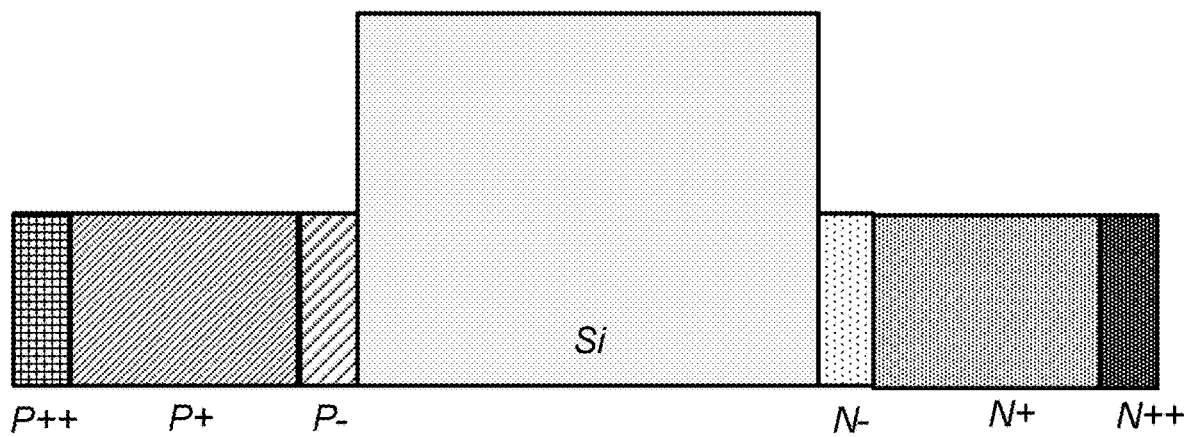
FIGS. 7A through 7G are simplified diagrams showing a method of forming an irregular PN junction having a sloped border line according an embodiment of the present invention.
Figure 7B:
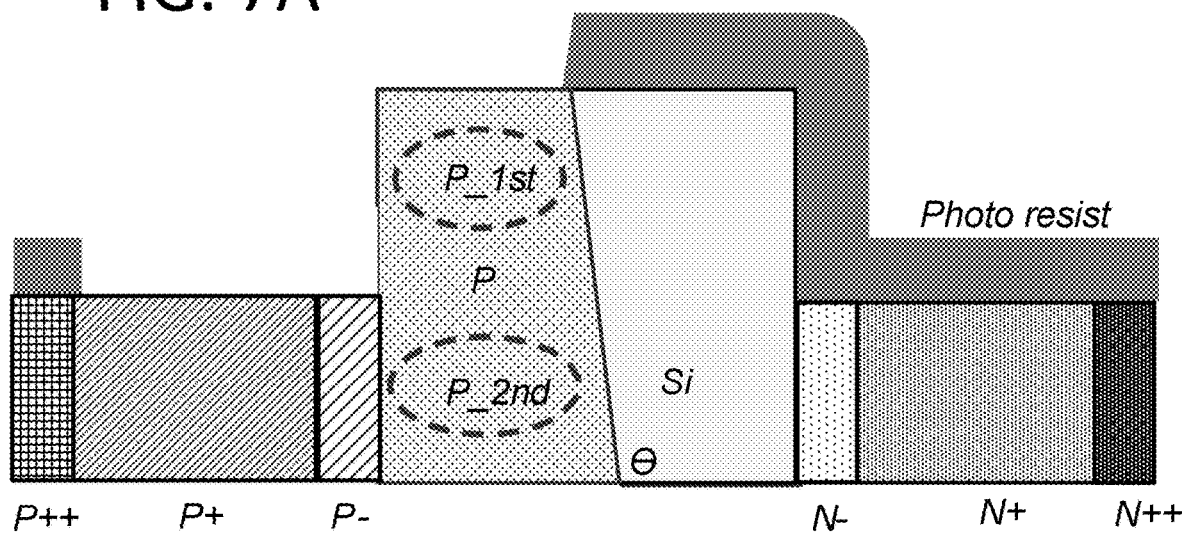
Figure 7C:
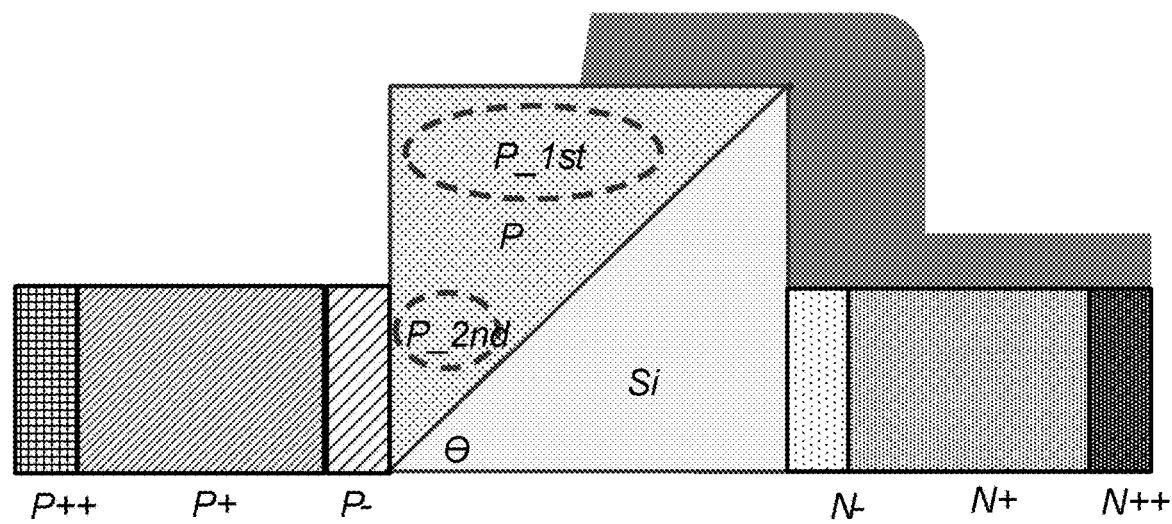

In an alternative embodiment, as shown in FIG. 7C, the second diffused width of the P_2nd region at the deeper depth is made to be smaller than the first diffused width of the P_1st region at a shallower depth of first columnized section. This allows the boundary of the just-formed p-type region to a sloped one with an angle smaller than 90 degrees relative to the nominal width direction. In the particular embodiment of FIG. 7C, the upper end point of the boundary reaches to the upper right corner of the central portion and the lower end point of the boundary reaches to the lower left corner of the central portion, making it a diagonal line of the rectangular shape which is naturally longer than the height thereof. Optionally, a thermal annealing process can be employed to activate the dopant at different depth to drive its diffusion to certain direction for facilitating the formation of the sloped border line. Common CMOS process is also involved during the formation of forming mask layer, opening an window, doping/implanting, thermal diffusing, removing mask layer and cleaning.

Figure 7D:
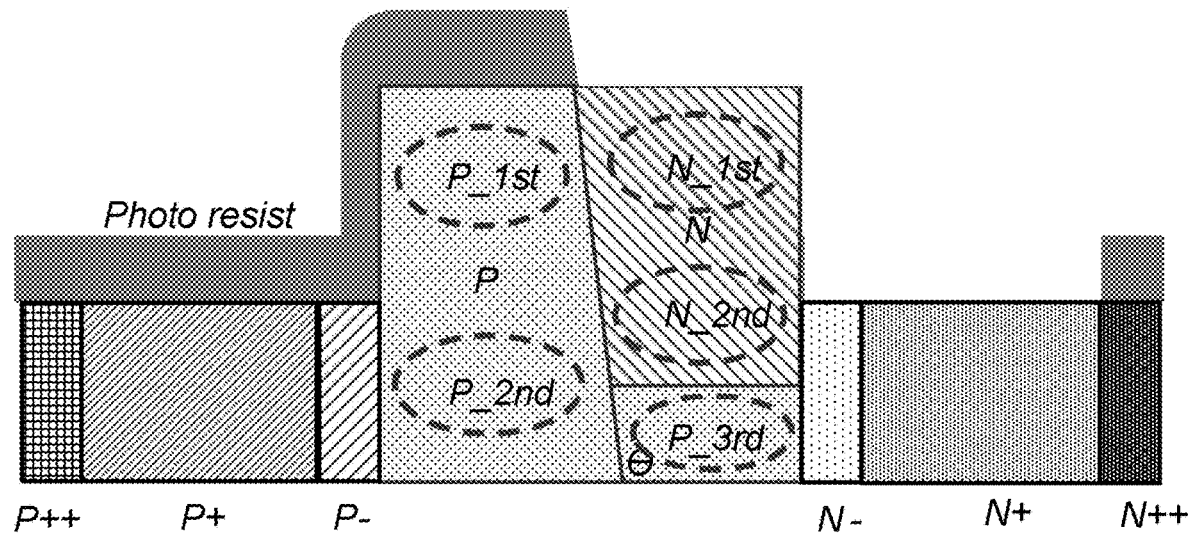
Figure 7E:
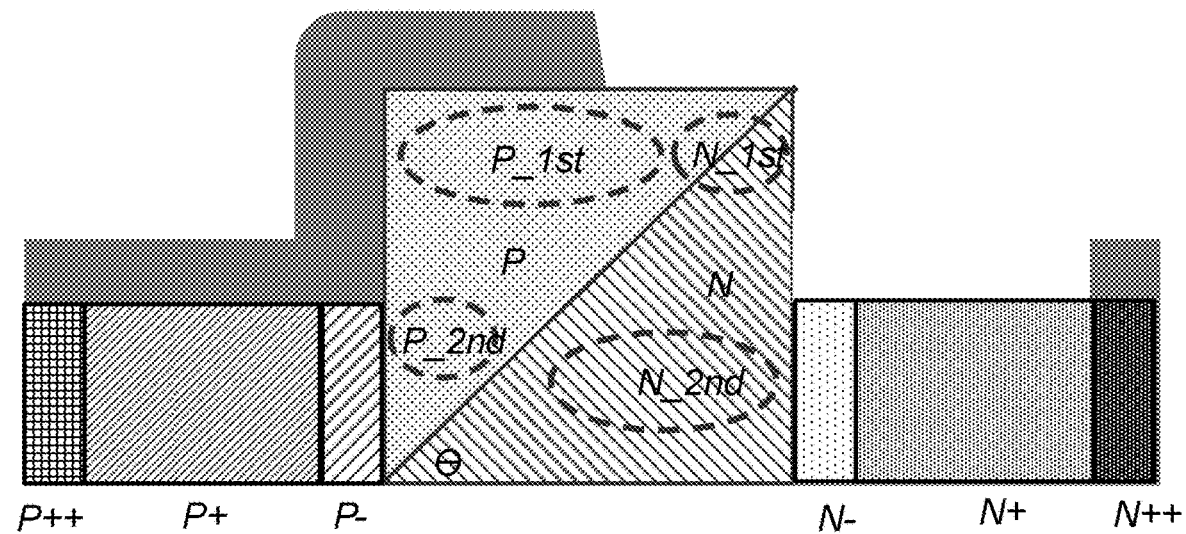

As a second window of the photoresist layer is opened by lithography (after removing old photoresist layer and coating a new photoresist layer) to virtually create a second columnized section next substantially to the first columnized section and next to a second side edge of the central portion (which is next to the second side portion), as shown in FIG. 7D or FIG. 7E, an implantation of n-type dopant (or p-type dopant, too) through the second window into the second columnized section. In an example shown in FIG. 7D which is a step following that of FIG. 7B, the implantation of n-type dopant leads to a formation of a N_1st region at a relative shallow depth of the second columnized section and a formation of a N_2nd region at a relative deeper depth, and another implantation of p-type dopant leads to a formation of a P_3rd region even deeper below the N_2nd region. Additionally, the P_3rd region is made by higher implantation energy to reach that depth and also to connect with the P_2nd region formed in the first columnized section to form a final p-region of the PN junction. Furthermore, the N_2nd region, which is connected to the N_1st region to form a n-region of the PN junction, is configured to be in contact with the second portion of the Si waveguide. The diffusion width of the n-region, provided with proper implantation energy of the n-type dopant, can be wide enough to have its boundary merged with the boundary of the p-region formed earlier. Thus, a border line of the PN junction is formed with a "L" shape. Additionally, both section-lines of the L-shaped border line can be sloped ones that is off from 90 degrees or 0 degree relative to the nominal width direction.

In an alternative embodiment, as shown in FIG. 7E, which is a step following that of FIG. 7C, the implantation process is performed by doping n-type dopant with a smaller implantation energy and a lower dose so that the N_1st is formed near a shallower region of the second columnized section. Referring back to FIG. 7C, part of the shallow depth second columnized region has be invaded by p-type dopant due to implantation with high dose, part of the N_1st region is overlapped with the P_1st region. By controlling the doses on each type of dopant, after final neutronization, a border line that separate p-region and n-region at this area remains to be same as before (i.e., a diagonal line of the rectangular shape). Further, the implantation of n-type with a greater implantation energy and much higher dose leads to a formation of a N_2nd region at a deeper depth of the second columnized section. Due to much higher dose, its diffusion width is much wider, allowing it to push its boundary well into the area of the first columnized section at the deeper depth. Thus, the final border line that separates the p-region and n-region remains to be the diagonal line as shown in FIG. 7E.

Figure 7F:
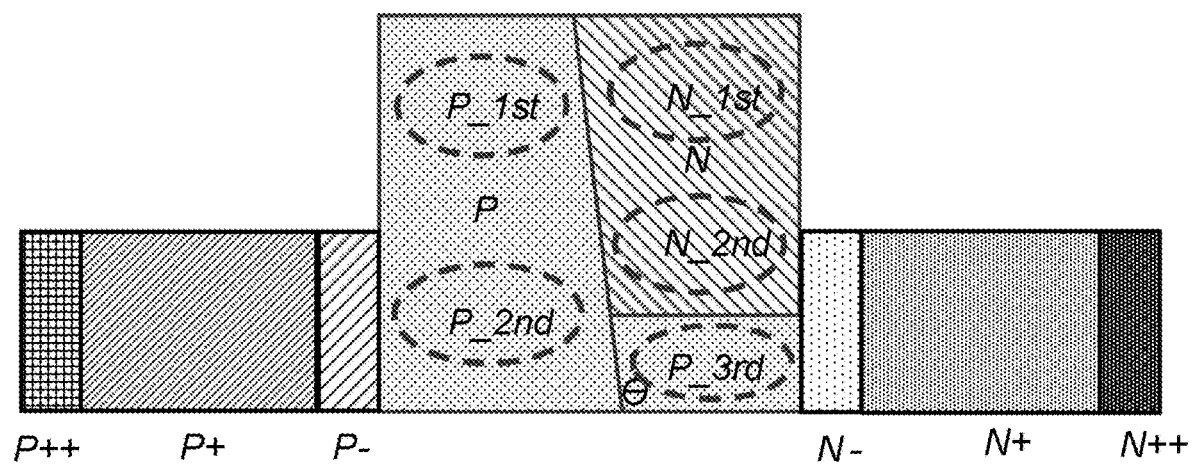
Figure 7G:
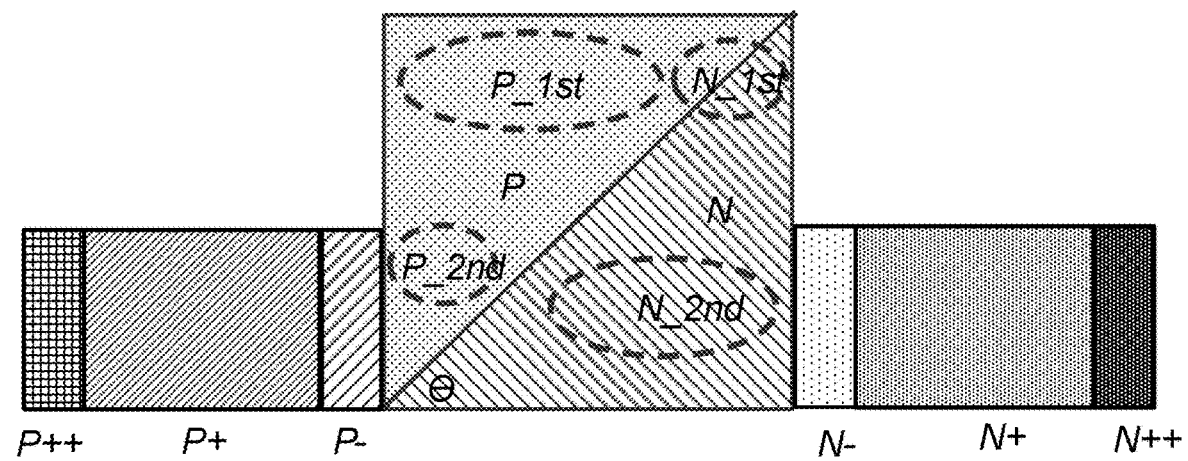

FIG. 7F and FIG. 7G just reveal what the PN junction with a L-shape or diagonal shape border line formed finally in the central portion of the Si waveguide for the embodiments mentioned above. FIGS. 7A through 7G are merely examples for forming irregular and prolonged border line of the PN junction in the ridge-shaped Si waveguide in the two branches of a Mach-Zehnder interferometer, based on which a silicon optical modulator with high modulation efficiency, low loss, and high bandwidth can be achieved. Yet, the examples described above should not unduly limit the scope of the claims. One of ordinary skill in the art would recognize many variations, alternatives, and modifications.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A silicon optical modulator comprising:
   two silicon waveguide branches coupled between a first 2×2 splitter at a common input end and a second 2×2 splitter at a common output end, each respective branch including a waveguide;
   at least one of the two silicon waveguide branches comprising a ridge-shape having a central portion of a height sandwiched in a nominal width direction by a first side portion and a second side portion throughout a length of the waveguide; and
   the central portion of the waveguide in each cross-section plane thereof comprising a p-region and a n-region separated by a continuous border line to form an irregular shaped PN junction, the border line being configured to have at least one section-line with a sloped angle relative to the nominal width direction and have a total border-length substantially longer than the height, the p-region at least partially being in contact with the first side portion and the n-region at least partially being in contact with the second side portion.

2. The silicon optical modulator of claim 1 wherein a cross-section plane of the central portion comprises a substantially rectangular shape made up by multiple doping sections of either p-type or n-type arranged in at least two rows in a nominal height direction and two or more columns in the nominal width direction with all p-type doping sections being connected together in the p-region and all n-type doping sections being connected together in the n-region.

3. The silicon optical modulator of claim 2 wherein at least one p-type doping section is in contact with the first side portion and at least one n-type doping section is in contact with the second side portion.

4. The silicon optical modulator of claim 2 wherein the cross-section plane is made up by four doping sections with two rows and two columns.

5. The silicon optical modulator of claim 2 wherein the cross-section plane is made up by six doping sections with three rows and two columns.

6. The silicon optical modulator of claim 2 wherein the cross-section plane is made up by 12 doping sections with three rows and four columns.

7. The silicon optical modulator of claim 2 wherein the continuous border line is made up by at least one first-type section-line and optionally one or more second-type section-lines, each first-type section-line being a border section-line between a p-type doping section and a n-type doping section in neighboring columns of a same row, each second-type section-lines being a border section-line between a p-type doping section and a n-type doping section in neighboring rows of a same column.

8. The silicon optical modulator of claim 7 wherein different doping sections in different rows of a same column comprise different doping profiles containing different dopants, implantation energies, and doses.

9. The silicon optical modulator of claim 7 wherein the first-type section-line comprises a sloped angle relative to the nominal height direction, the second-type section-line comprises a sloped angle up to several tens of degrees relative the nominal width direction, the sloped angle being depended on a selection of the implantation energies and doses of corresponding dopant.

10. The silicon optical modulator of claim 2 wherein the first side portion comprises a P− doping section connected to a P+ doping section connected further to a P++ doping section, wherein the P− doping section is in contact with at least one p-type doping section of the p-region of the irregular shaped PN junction throughout the length of the waveguide.

11. The silicon optical modulator of claim 2 wherein the second side portion comprises a N− doping section connected to a N+ doping section connected further to a N++ doping section, wherein the N− doping section is in contact with at least one n-type doping section of the n-region of the irregular shaped PN junction throughout the length of the waveguide.

12. The silicon optical modulator of claim 2 wherein the height of the central portion is greater than that of either the first side portion or the second side portion and is smaller than or equal to a width of the central portion.

13. A method for forming a silicon optical modulator comprising:
   providing a silicon layer in a silicon-on-insulator substrate;
   forming a first linear waveguide of a length in the silicon layer, the first linear waveguide comprising a ridge-shape having a central portion of a height of the silicon layer sandwiched in a nominal width direction by a first side portion and a second side portion throughout the length of the first linear waveguide;
   forming a second linear waveguide substantially the same as and in parallel at a side of the first linear waveguide to form two branches of a Mach-Zehnder interferometer with a common input end and a common output end; and
   forming an irregular shaped PN junction in the central portion throughout the length of the at least one of the first linear waveguide and the second linear waveguide, the irregular shaped PN junction in each cross-section plane of the central portion having a p-region and a n-region separated by a continuous border line, the continuous border line being configured to have at least one section-line with a sloped angle relative to the nominal width direction and having a total border-length substantially longer than the height of the central portion, the p-region at least partially being in contact with the first side portion and the n-region at least partially being in contact with the second side portion.

14. The method of claim 13 wherein forming the irregular shaped PN junction comprises:
configuring the central portion from atop to define one or more columnized sections in each cross-section plane along the nominal width direction;
forming a mask layer over the atop of the central portion;
forming a window in a photoresist layer over a selected one of the columnized sections;
doping a dopant selected from a p-type or an n-type dopant up to respective doses with respective energies into the selected one of the columnized sections to form respective one or more rows of p-type or n-type doping sections with a continuous sloped border line; and
removing the mask layer.

15. The method of claim 14 wherein doping comprises, with the window over the selected one of the columnized sections being in contact with the first side portion, forming at least one row of p-type doping section with the p-type dopant in the selected one of the columnized sections that is in contact with the first side portion.

16. The method of claim 15 wherein doping further comprises implanting the p-type dopant with different energies and different doses from the window into different depths of the at least one row of p-type doping section in the selected one of the columnized sections to form a border section-line of the p-type doping section with a sloped angle relative to the nominal width direction.

17. The method of claim 16 wherein doping further comprises implanting the n-type dopant with different energies and different doses from the window into different depths in the selected one of the columnized sections to form one or more rows of n-type doping sections to alter the border section-line that separates the one or more rows of n-type doping sections from the p-type doping section.

18. The method of claim 16 wherein doping comprises, with the window over the selected one of the columnized sections being in contact with the second side portion, forming at least one row of n-type doping section with the n-type dopant in the selected one of the columnized sections that is in contact with the second side portion.

19. The method of claim 18 wherein doping further comprises implanting the n-type dopant with different energies and different doses from the window into different depths of the at least one row in the selected one of the columnized sections to form a border section-line of the n-type doping section with a sloped angle relative to the nominal width direction; normalizing the border section-line of the n-type doping section with the border section-line of the p-type doping section to at least partially form the continuous border line of the irregular shaped PN junction that separates the n-region and the p-region.

20. The method of claim 13 wherein forming the first linear waveguide of the length in the silicon layer comprises forming the first side portion with substantially p-type doping characteristics including a P− doping section configured to contact with the p-region of the irregular shaped PN junction, a P+ doping section being next to the P− doping section, and a P++ doping section being further next to the P+ doping section; and forming the second side portion with substantially n-type doping characteristics including an N− doping section configured to contact with the n-region of the irregular shaped PN junction, an N+ doping section being next to the N− doping section, and an N++ doping section being further next to the N+ doping section.

* * * * *